United States Patent

Obara et al.

[11] Patent Number: 5,806,989
[45] Date of Patent: *Sep. 15, 1998

[54] COMPOUND BALL BEARING FOR SWING ARM UNIT AND SWING ARM UNIT FOR HARD DISC DRIVE DEVICE

[75] Inventors: Rikuro Obara; Katashi Tatsuno, both of Nagano-ken, Japan

[73] Assignee: Minebea Kabushiki-Kaisha, Nagano-ken, Japan

[*] Notice: The term of this patent shall not extend beyond the expiration date of Pat. No. 5,560,717.

[21] Appl. No.: 687,930

[22] Filed: Jul. 29, 1996

Related U.S. Application Data

[63] Continuation-in-part of Ser. No. 131,400, Oct. 5, 1993, Pat. No. 5,560,717.

[30] Foreign Application Priority Data

Oct. 7, 1992 [JP] Japan ................................ 4-293858
Nov. 9, 1992 [JP] Japan ................................ 4-323646

[51] Int. Cl.$^6$ .................................................... F16C 19/10
[52] U.S. Cl. ...................... 384/512; 384/517; 384/544; 384/613; 384/908
[58] Field of Search ...................... 384/512, 517, 384/613, 544, 908

[56] References Cited

U.S. PATENT DOCUMENTS

| 4,408,808 | 10/1983 | Redmann, Jr. et al. . |
| 4,607,182 | 8/1986 | Ballhaus ................................... 384/512 |
| 4,713,704 | 12/1987 | Voll et al. . |
| 5,013,947 | 5/1991 | Ide . |
| 5,045,738 | 9/1991 | Hishida et al. . |
| 5,048,982 | 9/1991 | Nakanishi ............................... 384/613 |
| 5,051,004 | 9/1991 | Takeuchui et al. ..................... 384/512 |
| 5,141,088 | 8/1992 | Kurihara et al. ........................ 384/512 |
| 5,207,701 | 5/1993 | Ishikawa et al. ....................... 384/544 |
| 5,556,209 | 9/1996 | Obara et al. ............................ 384/517 |

FOREIGN PATENT DOCUMENTS

| 3224448 | 2/1983 | Germany . |
| 3540363 | 6/1986 | Germany . |

OTHER PUBLICATIONS

Japanese Abstract No. 58–160322, vol. 9, No. 182 (p. 376) (1905), Jul. 27, 1985.
Japanese Abstract No. 63255869, vol. 13, No. 70 (p. 829), Feb. 2, 1989.
Japanese Abstract No. 61–224836, Oct. 6, 1986, Kazuaki Nakamaori.

*Primary Examiner*—Lenard A. Footland
*Attorney, Agent, or Firm*—Lowe Hauptman Gopstein Gilman & Berner

[57] ABSTRACT

A compound ball bearing for swing arm unit acomprises a bearing assembly including a spindle 1, a sleeve 2 surrounding the spindle 1, an inner ring fitted on the spindle, with balls 5 and 9 being provided between the spindle 1 and sleeve 2, between the inner ring 6 and sleeve 2. A swing arm 22 is mounted on the sleeve 2. Conventional outer rings are not necessary and the outer diameter of the sleeve can be made smaller than conventional devices.

3 Claims, 2 Drawing Sheets

COMPOUND BALL BEARING FOR SWING ARM UNIT AND SWING ARM UNIT FOR HARD DISC DRIVE DEVICE

This application is a continuation-in-part of application Ser. No. 08/131,400, filed Oct. 5, 1993, now U.S. Pat. No. 5,560,717, the contents of which are hereby incorporated by reference.

BACKGROUND OF THE INVENTION

1. Field of the Invention

This invention relates to a compound ball bearing for swing arm units and a swing arm unit for hard disc drive devices mainly used for office automation apparatuses.

2. Description of the Prior Art

A usual swing arm unit for hard disc drives, as shown in FIG. 6, comprises a bearing assembly 31 and a swing arm 32 mounted on a sleeve 33 of the bearing assembly 31.

A conventional bearing assembly comprises a spindle 34, a pair of conventional ball bearings 35, 35 and the sleeve 33. The conventional ball bearing has an inner ring 36, an outer ring 37 and balls 38.

SUMMARY OF THE INVENTION

An object of the present invention is to reduce the outer diameter of the compound ball bearing and to provide a smaller swing arm unit.

In a compound ball bearing for swing arm unit according to the invention comprising a bearing assembly including a stepped spindle having a large diameter portion and a small diameter portion, a sleeve surrounding said spindle, said large diameter portion of said spindle formed with an outer race for a first ball row, balls in said first row being provided between said outer race and an inner race formed in said sleeve, and an inner ring fitted on the small diameter portion of said spindle said inner having an outer race, balls in a second row being provided between said outer race of said inner ring and a corresponding inner race formed in said sleeve.

In the swing arm unit for a hard disc drive device according to the invention there is further provided a swing arm mounted on said sleeve.

DESCRIPTION OF THE PREFERRED EMBODIMENTS

Now, the invention will be described in conjunction with embodiments thereof illustrated in the accompanying drawings.

Figure 1:
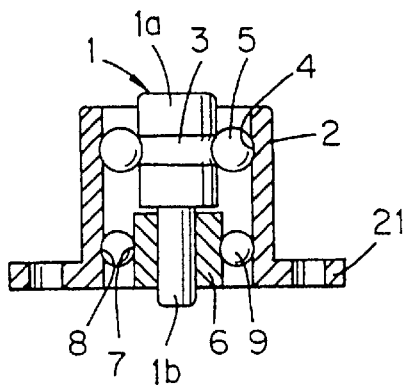
FIG. 1 is a sectional view showing an embodiment of the compound ball bearing for a swing arm unit in accordance with the present invention.

FIG. 1 shows a first embodiment of the compound ball bearing for swing arm unit according to the invention. Referring to the Figure, there is shown a double-row ball bearing, in which a spindle 1 and a sleeve 2 corresponding thereto and serving as an outer ring form a bearing assembly for retaining bearing balls provided in two rows.

The spindle 1 is stepped, and has a large diameter portion 1a and a small diameter portion 1b. The large diameter portion 1a has an outer race 3 for one ball row, while the sleeve 2 has an inner race 4 corresponding to the outer race 3 of the spindle. Balls 5 in a first row are provided between the outer race 3 of the spindle 1 and the inner race 4 of the sleeve 2.

On the small diameter portion of the spindle, an inner ring 6 is fitted, and balls 9 in a second row are provided between an outer race 7 formed in the inner ring 6 and a corresponding inner race 8 formed in the sleeve.

In the embodiment of FIG. 1, a flange 21 is formed on to lower end of the sleeve 2. The flange 21 serves to provide accurate setting of vertical position of a swing arm.

Figure 2:
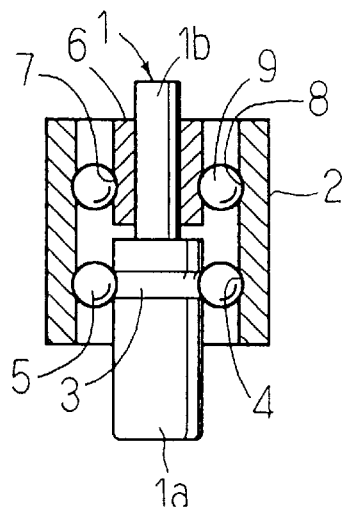
FIG. 2 is a sectional view showing another embodiment of the compound ball bearing for a swing arm unit according to the present invention.

FIG. 2 shows another embodiment, in which the sleeve 2 has no flange and is formed as a staraight tube.

Figure 3:
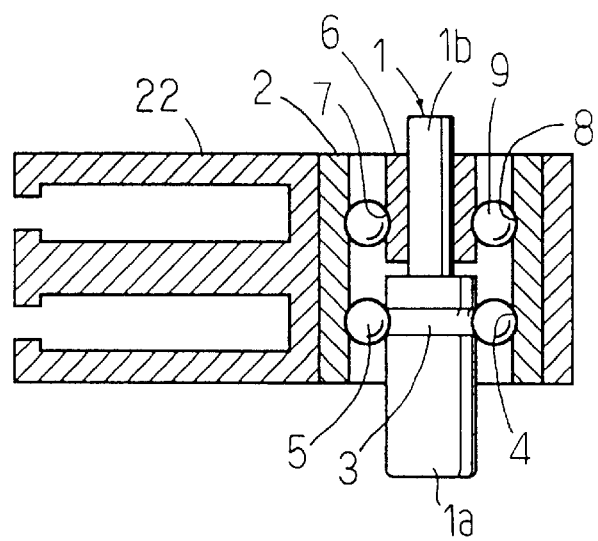
FIG. 3 is a sectional view showing a first embodiment of the swing arm unit for a hard disc drive device according to the present invention.

FIG. 3 shows a first embodiment of a swing arm unit for a hard disc drive device, in which a swing arm 22 is mounted on the sleeve 2.

In this embodiment, the construction of the bearing assembly is the same as the compound ball bearing shown in FIG. 2.

Figure 4:
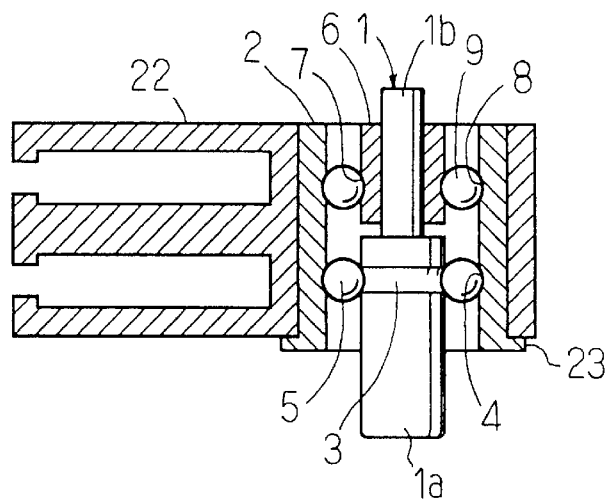
FIG. 4 is a sectional view showing a second embodiment of the swing arm unit for a hard disc drive device according to the present invention.

FIG. 4 shows a second embodiment, in which a flange 23 is formed on an outer periphery of an lower end of the sleeve 2.

Figure 5:
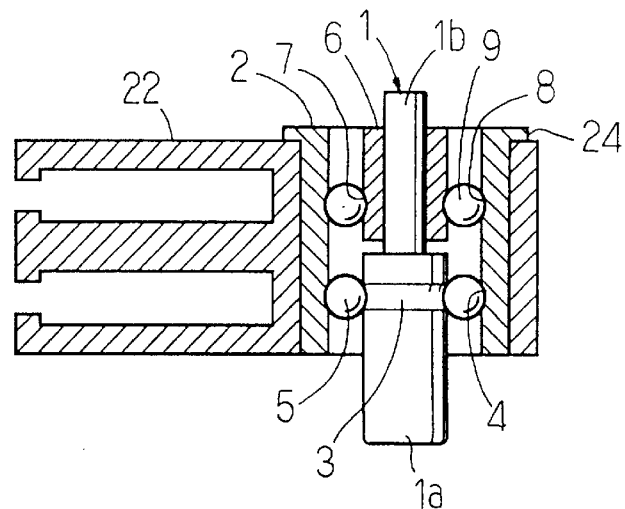
FIG. 5 is a sectional view showing a fourth embodiment of the swing arm unit for a hard disc drive device according to the present invention.
Figure 6:
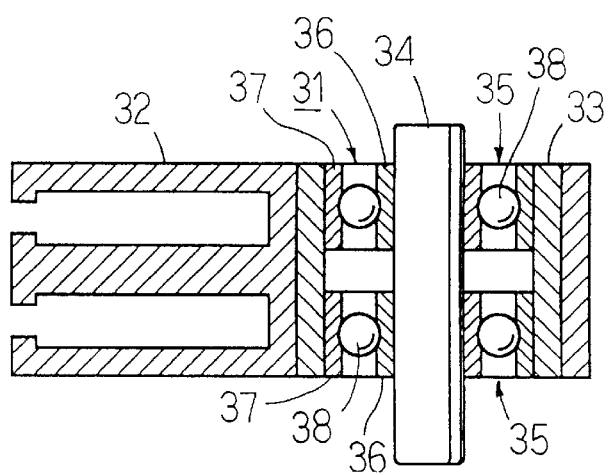
FIG. 6 is a sectional view showing a conventional swing arm unit for a hard disc drive device.

FIG. 5 shows a further embodiment, in which a flange 24 is formed on an outer periphery of an upper end of the sleeve 2.

In the above embodiments shown in FIGS. 4 and 5, each flange 23, 24 is served for accurate setting of virtical position of the swing arm 22.

In the embodiments of FIGS. 1 to 5, the inner ring 6 is fitted loosely on the spindle and set in a proper position with a pre-load applied from its end face. Then it is secured to the spindle by using an adhesive.

Each ball is suitably made of high carbon chromium bearing steel.

According to the invention, since the sleeve 2 of the compound ball bearing has inner races 4, 8, the conventional outer rings are not necessary. Therefore, the outer diameter of the sleeve can be made smaller and it is possible to provide a smaller swing arm unit.

What is claimed is:

1. A swing arm unit for a hard disc drive device comprising:

a bearing assembly including a stepped spindle (1) having a large diameter portion (1a) and a small diameter portion (1b), a sleeve (2) surrounding said spindle (1), said large diameter portion (1a) of said spindle (1) formed with an outer race (3) for one ball row, balls (5) in said one row being provided between said outer race (3) and an inner race (4) formed in said sleeve (2), and an inner ring (6) fitted on the small diameter portion (1b) of said spindle (1), said inner ring having an outer race (7), balls (9) in another row being provided between said outer race (7) of said inner ring and a corresponding inner race (8) formed in said sleeve (2), and a swing arm (22) mounted on said sleeve (2), said swing arm unit comprising only said inner ring (6) around said small diameter portion of said spindle, said inner race (8) formed in said sleeve (2) eliminating any requirement for an outer ring for said balls (9) in said outer race (7) of said inner ring (6) fitted on the small diameter portion (1b) of said spindle of said bearing assembly, said bearing assembly thereby being free of any outer ring around said small diameter portion of said spindle.

2. A swing arm unit in accordance with claim 1, wherein said inner race (4) formed in said sleeve eliminates any requirement for an outer ring for said balls (5) in said outer race (3) of said large diameter portion (1a) of said bearing assembly, said bearing assembly thereby being free of any outer ring around both said small diameter portion and said large diameter portion of said spindle.

3. A swing arm unit in accordance with claim 1, wherein said sleeve further comprises a flange on an outer periphery thereof, said flange supporting said swing arm.

* * * * *